Sept. 18, 1962

T. H. McVICAR 3,054,342

GRAIN AERATION STRUCTURE

Filed Oct. 1, 1959

INVENTOR.
Thomas H. McVicar

BY *Thos. G. Scofield*

ATTORNEY.

Sept. 18, 1962 T. H. McVICAR 3,054,342
GRAIN AERATION STRUCTURE
Filed Oct. 1, 1959 2 Sheets-Sheet 2

INVENTOR.
Thomas H. McVicar
BY Thos. E. Scofield
ATTORNEY.

United States Patent Office 3,054,342
Patented Sept. 18, 1962

---

3,054,342
GRAIN AERATION STRUCTURE
Thomas H. McVicar, Independence, Mo., assignor to Butler Manufacturing Company, Kansas City, Mo., a corporation of Missouri
Filed Oct. 1, 1959, Ser. No. 843,858
3 Claims. (Cl. 98—56)

This invention relates generally to structures adapted to be imbedded in and surrounded by grain and like materials and which provide a conduit through which air can be introduced into or drawn through the interior of the mass and caused to flow therethrough for purposes of aeration.

One of the principal objects of the invention is to provide a one-piece, light weight, low cost, self-supporting aeration duct section which, due to its manner of construction and special configuration, is capable of withstanding considerably higher loads with a given wall thickness and quality of material than is possible with ducts presently known to me. From actual tests conducted, it has been found that a duct made in accordance with the present invention is capable of withstanding loads of at least 50% greater magnitude than can be withstood by conventional ducts of the same material and wall thickness.

Another object of the invention is to provide a duct section of the character described which is capable of being coupled with like sections in an end-to-end fashion to obtain continuous ducts of varying length and in which effective coupling of the sections is accomplished with a minimum overlap of material, and without requiring fasteners. Aeration duct sections made according to the invention have the advantage of quick and easy assembly into the desired pattern and can just as easily be disassembled for removal to different locations.

Still another object of the invention is to provide a one-piece grain duct section which is entirely self-supporting, requiring no reinforcing braces or structures in order to preserve its tunnel-like configuration when the grain or other material is piled thereon.

A further object of the invention is to provide an aeration duct of one-piece construction and provided with considerable open area permitting passage therethrough of air into or from the grain. The novel configuration and structure of the duct makes it possible to combine the features of optimum open area and high strength.

A still further object of the invention is to provide an aeration duct assembly for mounting on the floor of a bin or storage structure, which assembly is characterized principally by the fact that the stresses induced in the assembly by the loading of grain thereon are localized in the duct sections themselves whereby to eliminate any necessity for providing heavy duty lateral support for the edges of the duct section. It is a feature of the invention that the only connection with the floor required is in the form of light-weight guide elements which serve only to index the duct sections in proper orientation in the bin and to prevent them from being displaced from the desired pattern by forces other than the grain load, such as accidental impact against them by workers or machinery.

Another object of the invention is to provide novel guide structure for duct sections of the character described, which guide structure is designed to facilitate and speed up the assembly of the duct sections in the desired pattern.

Other and further objects of the invention together with the features of novelty appurtenant thereto will appear in the course of the following description.

In the accompanying drawings, which form a part of the instant specification and are to be read in conjunction therewith, and in which like reference numerals indicate like parts in the various views.

Figure 1:
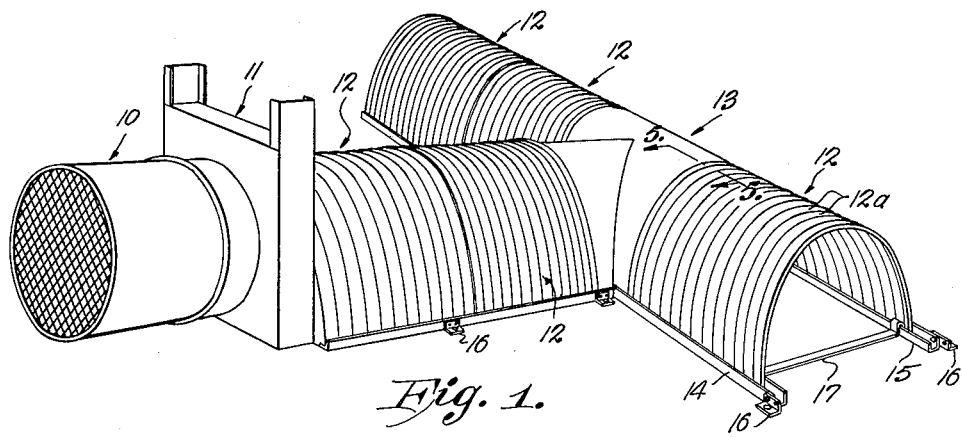
FIG. 1 is a perspective view of a typical grain aeration duct assembly incorporating structure embodying the invention.
Figure 2:
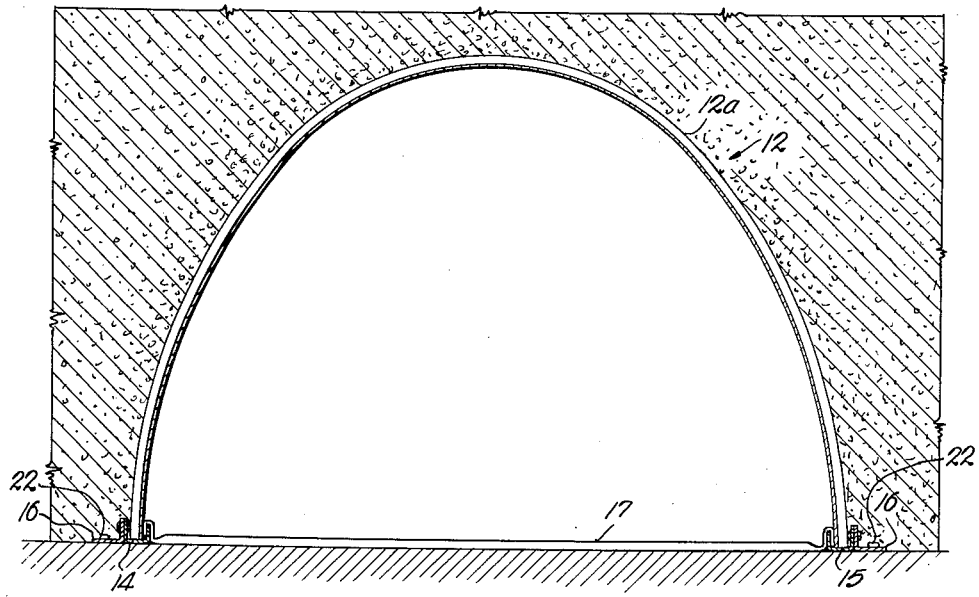
FIG. 2 is a transverse cross section, on an enlarged scale, through a section of the duct, guide structure and floor, showing the duct section surrounded by grain.

Referring to the drawings, in FIG. 1 I have shown a portion of a typical aeration duct assembly embodying the features of my invention. The fan housing 10 is of a conventional design and is connected with an adapter 11, which is for the purpose of connecting the fan to and through the wall of the storage structure (not shown). Neither the details of the fan nor adapter play any part in my invention, and consequently, no further description thereof will be given.

In the assembly shown, the duct sections are indicated generally by reference numeral 12. While they may be arranged in many different combinations and patterns, the duct sections are shown in FIG. 1 as arranged in a T-shaped pattern, a transition section 13 serving to connect the branches of the assembly. Each run or branch of ducting is made up of a plurality of serially connected duct sections 12. However, it will be observed that as to the right hand branch, only one section is shown in position in the base channels.

Broadly described, each duct section 12 comprises a transversely arched corrugated element having opposed parallel bottom edges. The edges of the sections in each run are received in base channels or guides 14 and 15 disposed parallel with one another and adapted to be tacked to the floor of the storage structure by clips or brackets 16. As will be set forth in greater detail later herein, tie or spacer bars 17 extend between the base channels of each run, the number depending on the length of the run.

The duct sections 12 are formed from a good quality sheet metal, such as galvanized steel, of 22, 24 or 26 gauge, and in lengths of from 32 inches to 36 inches. They are provided with a sinuously corrugated wall, the corrugations 12a running at right angles to the longitudinal axis, or in the direction of curvature of the duct section. Preferably the corrugations 12a have a depth from ridge to valley of approximately one-half inch and are spaced (ridge to ridge) nominally at two and one-half inches over the full length of the section. The end-most corrugations 12b differ somewhat from the median corrugations, as will be explained in greater detail at a later point herein.

In order to permit air to pass laterally from or into the duct sections, they are perforated over the full area with minute perforations on the order of one-sixteenth inch, but in any event, preferably less than 0.10 inch. The open area afforded by the perforations should be in the range of 20% to 30% of the total surface area of the duct section. A spacing of about 72 holes, 0.066 inch in diameter, to the square inch provides a 22% area for air passage and has proved quite satisfactory.

Figure 6:
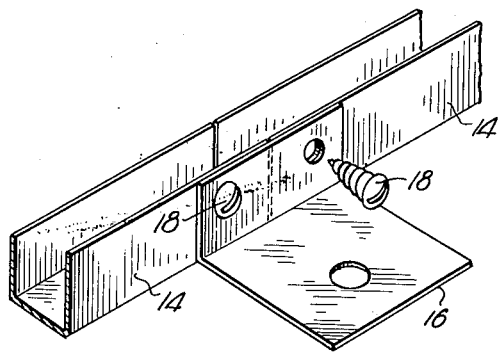
FIG. 6 is a fragmentary perspective view, greatly enlarged, illustrating the manner of connection of successive lengths of base channel with the floor clips.

The particular cross-sectional shape of the duct sections is of extreme importance in my invention. I have found that it is quite possible to make a one-piece aeration duct section in the gauges set forth above which will hold its shape under heavy grain loads if, in addition to the corrugations, the cross-section of the duct is made substantially semi-elliptical in curvature, the ellipse having a formula such that the square of one-half of the width of the duct section at the base, divided by the square of the height of the section on the center line, lies within a range of from 0.4 to 0.7. Actual tests carried out by me have revealed that by utilizing such a shape for the duct section, it is possible to localize substantially all stresses in the wall of the duct section and reduce the lateral reaction forces at the bottom edges of the duct section to practically zero. This, in turn, means that the base channels 14 and 15 of the assembly are required to assume no (or in some cases, depending on the condition of the grain, i.e., moisture content and type, only very slight) lateral loads. The great advantage in this discovery is that only nominal securing of the base channels to the deck or floor of the storage structure is required. The floor clips 16 can thus be spaced well apart along the channels and can be secured to the channels simply by the use of metal screws as illustrated at 18 in FIG. 6. The convenient location for the floor clips is as a splice between the adjoining ends of lengths of the base channel along the duct run, as is also shown in FIG. 6.

The maintenance of the configuration of the duct within the formula and range set forth above is critical to the success of the structure under maximum grain loads. It appears that with the relative dimensions within the range, the wall of the duct tends to act as a confined column curved in the direction of the curvature of the duct section. If overloaded, failure is in the form of compression failure. However, with values for width and height which result in a ratio falling outside the specified range, the duct section, under the grain load, tends to buckle at a point along the wall, thus destroying the column effect and results in collapse of the section.

Figure 3:
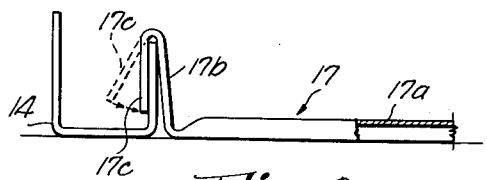
FIG. 3 is a fragmentary sectional view, on a greatly enlarged scale, illustrating the manner of connection between the spacer bars and guide channels of the assembly.

To assist in indexing the base channels in parallel position, and at the proper spacing in the intervals between the floor clips 16, there are provided the spacer bars 17. Each bar is in the form of a metallic member which may be longitudinally ribbed as at 17a. The ends of the bars are upturned to provide flanges 17b, which are bent over to provide a leg 17c which initially is spaced well away from the portion 17b, as shown in FIG. 3, to provide an open V-shaped structure which can be preliminarily slipped down over the inside leg of the base channel and field bent from the broken line position to the closed position adjacent the channel leg with any appropriate tool.

Because of the stress absorbing shape of the duct sections earlier described, the spacer bars 17, like the floor clips 16, are not required to carry any substantial loads. Their purpose is solely to maintain the channels in parallel condition during installation of the assembly and consequently, no fasteners are required.

It will be noted that the legs of the base channels 14 and 15 are of different heights, the inside leg being somewhat shorter than the outside leg. This assists materially in facilitating assembly of the individual duct sections with the base channels, as will be evident.

Figure 4:
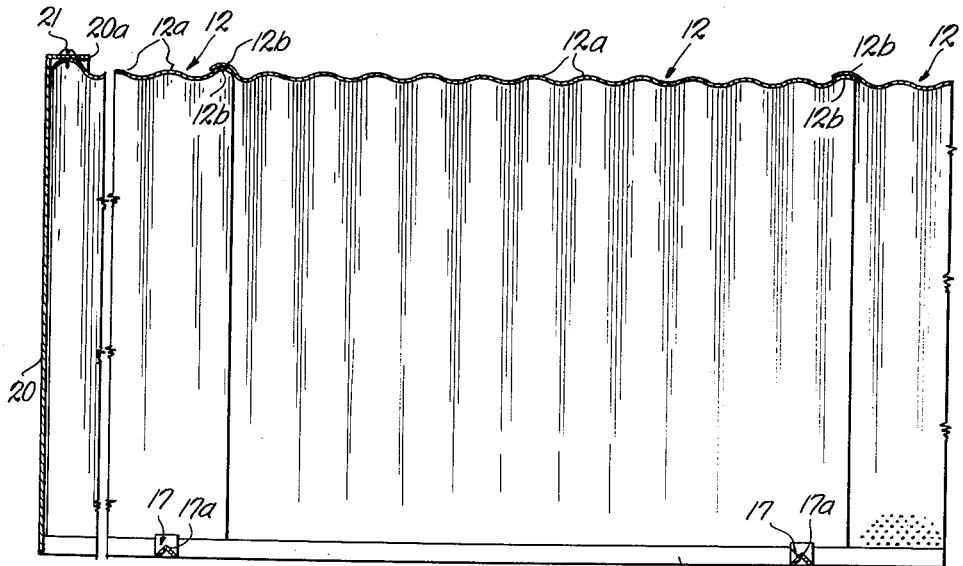
FIG. 4 is a fragmentary vertical longitudinal section taken through a duct made up of a plurality of end-to-end duct sections, parts broken away to indicate length.

Reference has previously been made to the provision at each end of the duct sections 12 of a uniquely formed rib or outwardly concave corrugation 12b, having greater depth than the corrugations 12a and of sharper curvature. The depth of the end corrugations 12b is approximately one-half again as much as the depth of the regular corrugations and the radius of curvature is approximately one-half of the curvature of the regular corrugations. As shown best in FIG. 4, the end connection of successive duct sections is made by overlapping the end ribs 12b. The sharper curvature assures of good resistance to longitudinal separation and at the same time produces a better grain seal than can be achieved with a single overlap with shallower corrugations.

Figure 5:
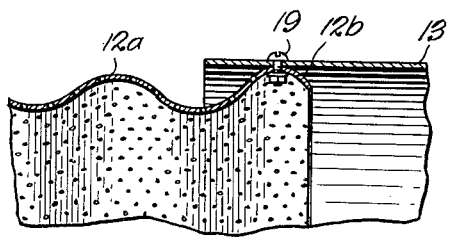
FIG. 5 is a fragmentary section on an enlarged scale, taken generally along the line 5—5 of FIG. 1, in the direction of the arrows.

In connecting the duct with a transition section or adapter, such as shown at 13, fasteners will be used as illustrated in FIG. 5. These may be simple bolts 19, spaced at intervals along the curve of the transition section and extending through and secured to the rib 12b.

At the end of individual duct runs, the tunnel may be closed off by simple plate-like closure 20 (see FIG. 4) which has a flange 20a adapted to overlie and be secured to the end of the duct by metal screws 21.

The assembly of the ducts into operating position on the storage structure floor is a quick and simple operation. Base channels 14 and 15 are preliminarily laid out at the proper spacing and orientation by use of spacer bars 17 and are tied to the floor by the clip 16, simple lag bolts 22 being employed to secure the clips to the floor. It has been found that only one spacer bar for each duct section is required. The duct sections 12 are then dropped or fitted in place in the channels in serial fashion, each succeeding section being coupled with the preceding section by overlapping the end ribs 12b. The duct section closest to the fan wall adapter 11 is coupled therewith in the usual fashion. Transition section 13 is secured in place and the ends of the branches closed with plates 20. The assembly is now ready for use.

It will be evident that disconnection of the duct sections from the base channels requires nothing more than lifting them free from the channels. There are no bolts or fasteners required to connect the duct section ends to one another nor to connect the ducts with the base channels. Furthermore, the sections, when not in use, can be conveniently nested within one another.

From the foregoing it will be seen that the invention is one well adapted to attain all of the ends and objects herein above set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A grain aeration duct section consisting of an elongate horizontal, open bottom, transversely arched one-piece tunnel structure symmetrical with respect to the longitudinal center line thereof, the arch of the tunnel being substantially semi-elliptical and within the formula wherein the ratio of the square of one-half the maximum width of said structure to the square of the height lies within a range of from 0.4 to 0.7, the wall of the structure being formed with parallel sinuously continuous corrugations running at right angles to the center line and being further provided with minute perforations of a maximum dimension of less than 0.10 inch, the total combined open area provided by the perforations being from 20% to 30% of the total surface area of said structure.

2. A grain aeration duct as in claim 1 wherein said structure terminates at each end in an outwardly convex corrugation of greater depth and transverse curvature than the adjacent corrugations.

3. A grain aeration duct section consisting of an elongate horizontal, open bottom, transversely arched one-piece tunnel structure symmetrical with respect to the longitudinal center line thereof, and formed from sheet metal of uniform thickness, the arch of the tunnel being substantially semi-elliptical and within the formula wherein the ratio of the square of one-half the maximum width of said structure to the square of the height lies within a range of from 0.4 to 0.7, the wall of the structure being formed with parallel sinuously continuous corrugations running at right angles to the center line, and being further provided with minute perforations of a maximum dimension of less than 0.10 inch, and total combined open area of from 20% to 30% of the total surface area of said structure.

References Cited in the file of this patent

UNITED STATES PATENTS

| | | |
|---|---|---|
| 1,214,033 | Hercer | Jan. 30, 1917 |
| 2,196,391 | Gronert | Apr. 9, 1940 |
| 2,466,362 | Blake | Apr. 5, 1949 |
| 2,645,991 | Hobson | July 21, 1953 |
| 2,859,683 | Seim | Nov. 11, 1958 |
| 2,907,036 | Collins | Sept. 29, 1959 |
| 2,955,523 | Rasch | Oct. 11, 1960 |